(12) United States Patent
Itoh

(10) Patent No.: US 9,357,189 B2
(45) Date of Patent: May 31, 2016

(54) PROJECTOR

(71) Applicant: Seiko Epson Corporation, Tokyo (JP)

(72) Inventor: Yoshitaka Itoh, Matsumoto (JP)

(73) Assignee: Seiko Epson Corporation (JP)

( * ) Notice: Subject to any disclaimer, the term of this patent is extended or adjusted under 35 U.S.C. 154(b) by 204 days.

(21) Appl. No.: 13/875,572

(22) Filed: May 2, 2013

(65) Prior Publication Data

US 2013/0293849 A1  Nov. 7, 2013

(30) Foreign Application Priority Data

May 7, 2012   (JP) .................................. 2012-105676

(51) Int. Cl.
  *G03B 21/14*   (2006.01)
  *H04N 9/31*    (2006.01)
  *G02B 26/00*   (2006.01)

(52) U.S. Cl.
  CPC ............ *H04N 9/3164* (2013.01); *G02B 26/008* (2013.01); *H04N 9/3111* (2013.01); *H04N 9/3114* (2013.01); *H04N 9/3152* (2013.01)

(58) Field of Classification Search
  CPC ..... G03B 21/14; H04N 9/3164; H04N 9/3114
  USPC ................................ 353/59, 84, 892; 359/889
  See application file for complete search history.

(56) References Cited

U.S. PATENT DOCUMENTS

| | | | | |
|---|---|---|---|---|
| 7,427,146 | B2 * | 9/2008 | Conner | 362/268 |
| 2003/0179346 | A1 * | 9/2003 | Mihara | 353/31 |
| 2004/0207816 | A1 * | 10/2004 | Omoda et al. | 353/31 |
| 2007/0046901 | A1 * | 3/2007 | Kuno | 353/69 |
| 2008/0278689 | A1 * | 11/2008 | Read et al. | 353/7 |

FOREIGN PATENT DOCUMENTS

| | | | |
|---|---|---|---|
| JP | 2000-075406 A | 3/2000 | |
| JP | 2003-149597 A | 5/2003 | |
| JP | 2007059139 A * | 3/2007 | F21S 8/04 |

OTHER PUBLICATIONS

Translation of JP2007-59139.*

* cited by examiner

*Primary Examiner* — William C Dowling
*Assistant Examiner* — Jerry Brooks
(74) *Attorney, Agent, or Firm* — Harness, Dickey & Pierce, P.L.C.

(57) ABSTRACT

A projector includes: a light source having a plurality of light emitting sections; a light modulation device including a reflecting section adapted to reflect the light from the light source in accordance with image information; and a projection lens adapted to project an image formed by the light modulation device, wherein the light from the light source obliquely enters the reflecting section, the light source includes a first region where the light emitting sections are disposed at a first density, and a second region where the light emitting sections are disposed at a second density higher than the first density, and a distance between the first region and the reflecting section is shorter than a distance between the second region and the reflecting section.

7 Claims, 7 Drawing Sheets

PROJECTOR

BACKGROUND

1. Technical Field

The present invention relates to a projector.

2. Related Art

As a light modulation device of a projector, there has been known a digital micromirror device (DMD) provided with a plurality of micromirrors, and capable of projecting an image corresponding to image data on a screen by the micromirrors each being driven in a time-divisional manner based on the image data. The DMD is a reflective image forming element, and controls the tilt direction of each of the micromirrors in accordance with the image information, and reflects the light from the light source toward the projection system to thereby form the image. Since the DMD is a reflective image forming element, it is necessary to input an illumination light beam from a direction oblique to the normal line of the image forming surface (the surface on which the micromirrors are arranged, namely a reflecting surface) of the DMD (see, e.g., JP-A-2004-279843).

Here, in the projector, in general, it is preferable to illuminate the image forming element with an illumination light beam having a light intensity distribution homogenous in the cross-section of the beam.

However, as described above, in the reflective light modulation device such as the DMD, since the illumination light beam is input from the direction oblique to the image forming surface, an uneven illuminance distribution appears on the image forming surface. Therefore, there is a problem that a luminance variation occurs in the projection image and the image quality of the projection image is degraded.

SUMMARY

An object of some aspects of the invention is to provide a projector capable of improving the image quality of the projection image than ever.

A projector according to an aspect of the invention includes a light source having a plurality of light emitting sections, a light modulation device including a reflecting section adapted to reflect the light from the light source in accordance with image information, and a projection lens adapted to project an image formed by the light modulation device, the light from the light source obliquely enters the reflecting section, the light source includes a first region where the light emitting sections are disposed at a first density, and a second region where the light emitting sections are disposed at a second density higher than the first density, and a distance between the first region and the reflecting section is shorter than a distance between the second region and the reflecting section.

According to such a projector as described above, the intensity distribution (the illuminance distribution) of the light entering the reflecting section can be equalized. Therefore, an image with the brightness variation reduced can be obtained, and thus the image quality of the projection image can be improved.

A projector according to another aspect of the invention includes a light source having a plurality of light emitting sections, a light modulation device including a reflecting section adapted to reflect the light from the light source in accordance with image information, and a projection lens adapted to project an image formed by the light modulation device, the light from the light source obliquely enters the reflecting section, the light source includes a first region where the light emitting sections emit light at a first emission intensity when projecting the image, and a second region where the light emitting sections emit light at a second emission intensity higher than the first emission intensity when projecting the image, and a distance between the first region and the reflecting section is shorter than a distance between the second region and the reflecting section.

According to such a projector as described above, the intensity distribution (the illuminance distribution) of the light entering the reflecting section can be equalized. Therefore, an image with the brightness variation reduced can be obtained, and thus the image quality of the projection image can be improved.

In the projector of the aspects of the invention, it is also possible that a contour shape of a region where the light emitting sections are disposed has a shape obtained by distorting a shape similar to a planar shape of the reflecting section in such a manner that the shorter a distance between a portion of the region and the reflecting section is, the more greatly the shape corresponding to the portion is enlarged.

According to such a projector as described above, the distortion of the cross-sectional shape of the illumination light beam caused by the reflecting section being irradiated with the light from the light source from the oblique direction can be corrected. Therefore, it is possible to efficiently irradiate the reflecting section with the light from the light source, and thus the light efficiency can be improved.

In the projector of the aspects of the invention, it is also possible that there is further included a rod lens located between the light source and the light modulation device, the rod lens has a first end surface to which the light from the light source is input, and a second end surface from which the light input from the first end surface is emitted, and the first end surface and the second end surface have the same shape as a contour shape of a region where the light emitting sections are disposed.

According to such a projector as described above, it is possible to efficiently guide the light to the reflecting section while keeping the light intensity distribution and the angle distribution of the light having entered the rod lens.

In the projector of the aspects of the invention, it is also possible that a density of the light emitting sections in the first region and a density of the light emitting sections in the second region are equal to each other.

According to such a projector as described above, an image with the brightness variation reduced can be obtained, and thus the image quality of the projection image can be improved.

A projector according to still another aspect of the invention includes a light source having a plurality of light emitting sections, an anisotropic diffusion element adapted to vary at least one of a diffusion direction and a diffusion intensity distribution of light from the light source, a light modulation device including a reflecting section adapted to reflect the light, which is emitted from the anisotropic diffusion element, in accordance with image information, and a projection lens adapted to project an image formed by the light modulation device, the light emitted from the anisotropic diffusion element obliquely enters the reflecting section, and the anisotropic diffusion element emits light having a light intensity distribution to be equalized in the reflecting section.

According to such a projector as described above, the intensity distribution (the illuminance distribution) of the light entering the reflecting section can be equalized. Therefore, an image with the brightness variation reduced can be obtained, and thus the image quality of the projection image can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some preferred embodiments of the invention will be explained in detail with reference to the accompanying drawings. It should be noted that the embodiments described below do not unreasonably limit the contents of the invention as set forth in the appended claims. Further, all of the constituents explained hereinafter are not necessarily essential elements of the invention.

1. First Embodiment

Figure 1:
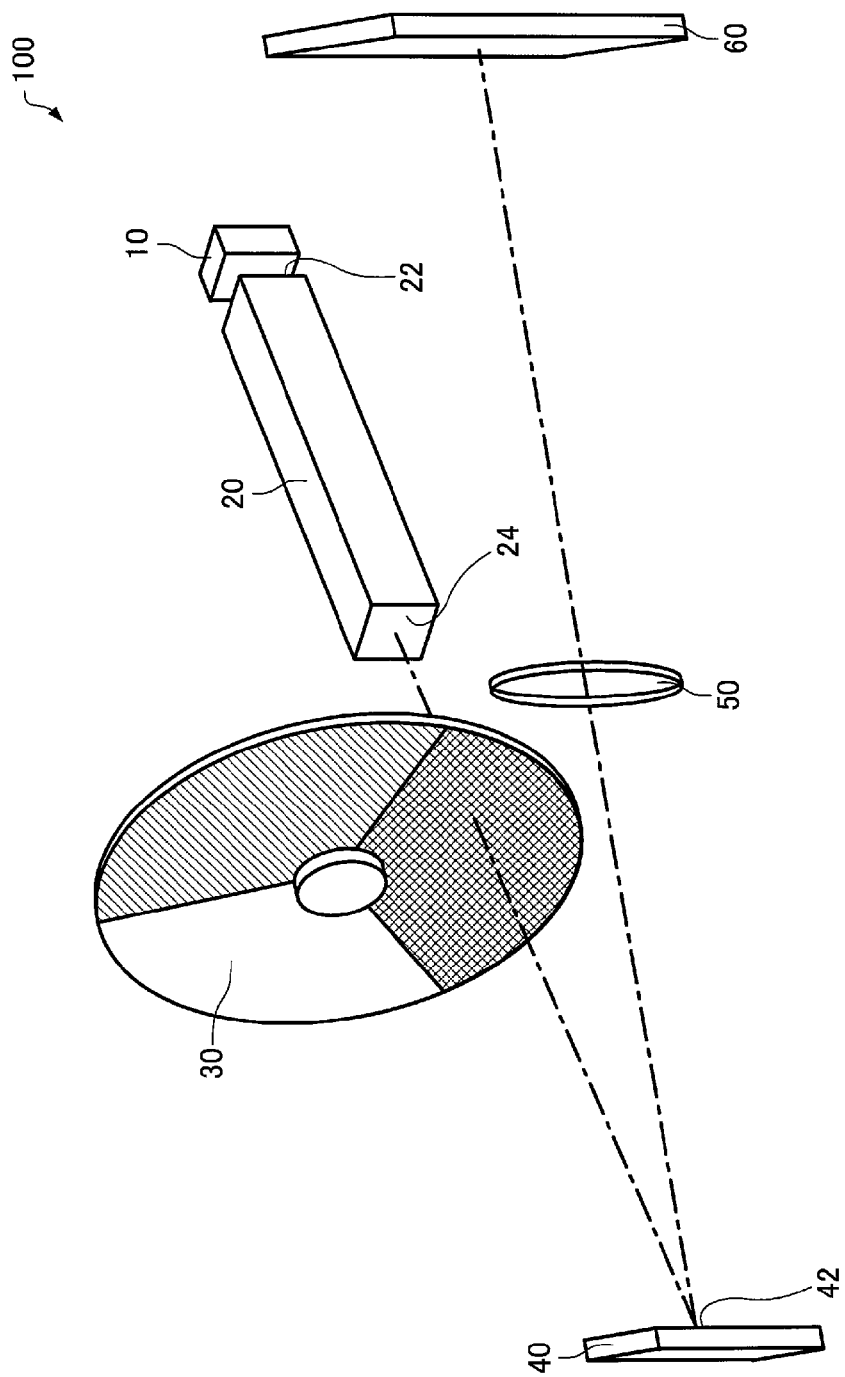
FIG. 1 is a perspective view schematically showing a projector according to a first embodiment of the invention.

Firstly, a projector according to a first embodiment will be explained with reference to the accompanying drawings. FIG. 1 is a perspective view schematically showing a projector 100 according to the present embodiment.

As shown in FIG. 1, the projector 100 includes a light source 10, a light modulation device 40, and a projection lens 50. Further, the projector 100 can include a rod lens 20, and a color wheel 30.

Figure 2:
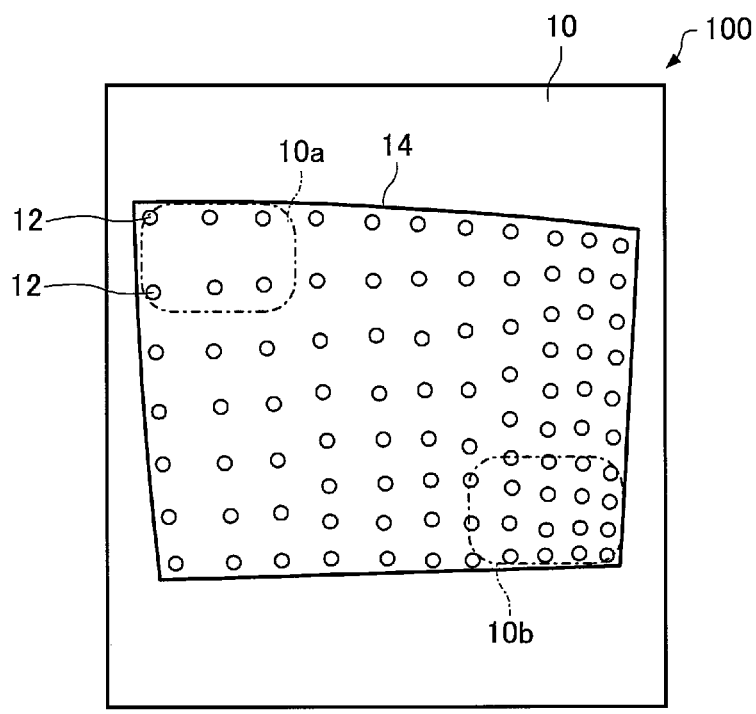
FIG. 2 is a plan view schematically showing a light source of the projector according to the first embodiment.

The light source 10 generates a white illumination light beam with which the light modulation device 40 is irradiated. FIG. 2 is a plan view schematically showing the light source 10 viewed from the side to which the light is emitted.

As shown in FIG. 2, the light source 10 has a plurality of light emitting sections (light emitting bodies) 12. The light source 10 irradiates a reflecting section 42 of the light modulation device 40 with emission light beams emitted from the plurality of light emitting sections 12. In other words, the illumination light beam with which the reflecting section 42 of the light modulation device 40 is irradiated is formed of the emission light beams emitted from the plurality of light emitting sections 12. The illumination light beam enters (oblique-incidence) from a direction oblique to a normal line of the reflecting section 42. It should be noted that the normal line of the reflecting section 42 denotes a normal line of a surface on which micromirrors 44 described later provided to the reflecting section 42 are arranged in a two-dimensional array. The light emitting sections 12 are each, for example, an emitting section of light of a light emitting element. As the light emitting element, there can be cited, for example, a semiconductor laser (LD), a super luminescent diode (SLD), a light emitting diode (LED), and an organic electroluminescence (OEL).

The light emitting sections 12 are respectively formed of, for example, light emitting elements having substantially the same performances, and for example, the emission intensity during the image projection is the same among the light emitting sections 12.

The light emitting sections 12 are arranged in the light emitting region 14 of the light source 10. For example, by disposing a plurality of light emitting elements and arranging the emitting sections of the light emitting elements in a two-dimensional array, the light emitting sections 12 can be arranged. The light emitting sections 12 are arranged in a single plane. The light emitting region 14 is a region where the light emitting sections 12 are arranged. For example, it can be said that the light emitting region 14 is a region surrounded by a contour line along the light emitting sections 12 disposed outermost. The emission light beams emitted from the light emitting sections 12 proceed along the perpendicular of the plane in which the light emitting sections 12 are arranged.

In the light emitting region 14, the arrangement density (the number of the light emitting sections per unit area) of the light emitting sections 12 is different among regions. Specifically, in the light emitting region 14, the shorter the distance from the reflecting section 42 of the light modulation device 40 is, the lower the arrangement density of the light emitting sections 12 is. In the example shown in the drawings, the distance between a first region 10a of the light emitting region 14 and the reflecting section 42 of the light modulation device 40 is shorter than the distance between a second region 10b of the light emitting region 14 and the reflecting section 42 of the light modulation device 40. Further, the arrangement density of the light emitting sections 12 in the first region 10a is lower than the arrangement density of the light emitting sections 12 in the second region 10b. Thus, the light source 10 can emit the light (the illumination light beam) having the light intensity to be equalized in the reflecting section 42 of the light modulation device 40. It should be noted that the distance between the first region 10a and the reflecting section 42 denotes an average of the light path lengths (the distances along the light axis) of the emission light beams of the light emitting sections 12 located in the first region 10a. Further, the distance between the second region 10b and the reflecting section 42 denotes an average of the light path lengths of the emission light beams of the light emitting sections 12 located in the second region 10b. Further, the arrangement density of the light emitting sections 12 can be replaced with the distance between the light emitting sections 12 adjacent to each other. Specifically, if the arrangement density of the light emitting sections 12 is low, the distance between the light emitting sections 12 adjacent to each other is long, and if the arrangement density of the light emitting sections 12 is high, the distance between the light emitting sections 12 adjacent to each other is short.

In the regions except the first region 10a and the second region 10b, the arrangement density of the light emitting sections 12 is set in accordance with the distance between each of the regions and the reflecting section 42. For example, in the region sandwiched between the first region 10a and the second region 10b, the distance between the region and the reflecting section 42 is longer than the distance between the first region 10a and the reflecting section 42, and shorter than the distance between the second region 10b and the reflecting section 42. Therefore, the arrangement density of the light emitting sections 12 in the region sandwiched between the first region 10a and the second region 10b is higher than the arrangement density of the light emitting sections 12 in the first region 10a and lower than the arrangement density of the light emitting sections 12 in the second region 10b.

By setting the arrangement density of the light emitting sections 12 in each of the regions as described above, it is arranged that the arrangement density of the light emitting sections 12 varies in a substantially continuous manner in accordance with the distance of the light emitting sections 12 between the light emitting region 14 and the reflecting section 42 of the light modulation device 40.

As shown in FIG. 2, the light emitting region 14 has a shape obtained by distorting a shape (a rectangular shape in the example shown in the drawing) similar to the reflecting section 42 of the light modulation device 40. Specifically, the shape (the contour shape of the region where the light emitting sections 12 are arranged) of the light emitting region 14 has a shape obtained by distorting the shape (e.g., a rectangle) of the reflecting section 42 in such a manner that the shorter the distance between a portion of the light emitting region 14 and the reflecting section 42 is, the more greatly the shape corresponding to the portion is enlarged (the longer the distance between the portion and the reflecting section 42 is, the more greatly the shape corresponding the portion is shrunk). Thus, the distortion of the cross-sectional shape of the illumination light beam caused by the reflecting section 42 being irradiated with the illumination light beam from an oblique direction can be corrected. Therefore, for example, the shape of the illumination light beam in the reflecting section 42 can be made to be the same shape as the shape (rectangle) of the reflecting section 42 of the light modulation device 40. Therefore, the light efficiency can be improved. Hereinafter, the reason therefor will be explained.

For example, if the shape of the light emitting region 14 of the light source 10 is a rectangle, in the case of inputting the illumination light beam to the reflecting section 42 along the normal line of the reflecting section 42 of the light modulation device 40 (in the case in which the incident angle of the illumination light beam to the reflecting section 42 is 0°), the shape of the illumination light beam is a rectangle in the reflecting section 42. In contrast, in the case of inputting the illumination light beam from a direction oblique to the normal line of the reflecting section of the light modulation device 40, the shape of the illumination light beam becomes the shape obtained by distorting the rectangle in such a manner that the longer the distance between a portion of the light emitting region 14 and the reflecting section is, the more greatly the rectangle corresponding to the portion is enlarged in the reflecting section 42. Therefore, the proportion of the light failing to enter the reflecting section increases, and thus the light efficiency is degraded. In the light source 10, since the shape of the light emitting region 14 is the shape obtained by deforming the shape (the rectangle) of the reflecting section 42 in such a manner that the shorter the distance between a portion of the light emitting region 14 and the reflecting section 42 is, the more greatly the shape corresponding to the portion is enlarged, even if the illumination light beam enters the reflecting section 42 from an oblique direction, the shape of the illumination light beam can be corrected so as to approximate the shape (the rectangle) of the reflecting section 42 in the reflecting section 42. As described above, in the light source 10, the distortion of the cross-sectional shape of the illumination light beam caused by the reflecting section 42 being irradiated with the illumination light beam from the oblique direction can be corrected.

As shown in FIG. 1, the rod lens 20 is located between the light source 10 and the light modulation device 40. In the example shown in the drawing, the rod lens 20 is located between the light source 10 and the color wheel 30. The rod lens 20 can partially overlap the emission light beams from the respective light emitting sections 12 of the light source 10 on the illumination object (the reflecting section 42 of the light modulation device 40). Therefore, it is possible to equalize the light intensity distribution (illuminance distribution) in the reflecting section 42. Further, the rod lens 20 can improve the light efficiency. It should be noted that the rod lens 20 can be formed of a rod-shaped glass member or resin member having a light transmissive property, and further, a light guide member obtained by providing a reflecting surface to an inner surface of a tubular member can be used as the rod lens 20.

The rod lens 20 has an entrance end surface 22 to which the illumination light beam from the light source 10 is input, and an exit end surface 24 from which the illumination light beam thus input from the entrance end surface 22 is emitted. The entrance end surface 22 and the exit end surface 24 each have a shape similar to the light emitting region 14. Thus, it is possible to efficiently guide the illumination light beam to the reflecting section 42 while keeping the light intensity distribution of the illumination light beam having entered the rod lens 20.

The color wheel 30 is located between the light source 10 and the light modulation device 40. In the example shown in the drawing, the color wheel 30 is located between the rod lens 20 and the light modulation device 40. It should be noted that the color wheel 30 can be located between the light source 10 and the light modulation device 40. In a case in which the light from the light source 10 is white light, the color wheel 30 is capable of sequentially generating the light with the three primary colors from the white light. The color wheel 30 rotates in sync with the input of the image information to the light modulation device 40 due to an electric motor not shown.

The light modulation device 40 is provided with the reflecting section 42 for reflecting the illumination light beam from the light source 10 in accordance with the image information. The light modulation device 40 is, for example, a digital micromirror device (DMD).

Figure 3A:
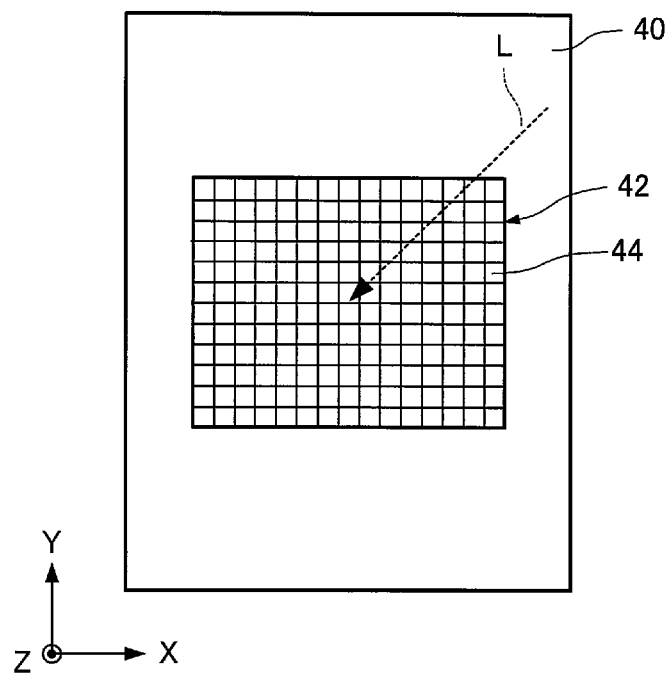
FIGS. 3A and 3B are plan views schematically showing a light modulation device of the projector according to the first embodiment.
Figure 3B:
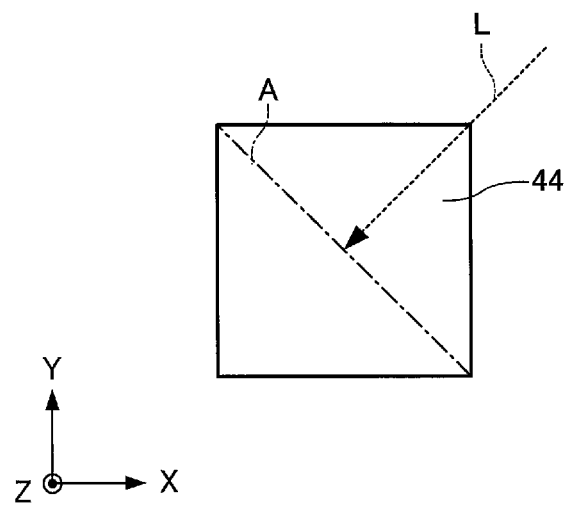

FIG. 3A is a plan view schematically showing the light modulation device 40, and FIG. 3B is a plan view schematically showing a micromirror (a mirror element) 44 of the light modulation device 40. It should be noted that in FIGS. 3A and 3B, an X axis, a Y axis, and a Z axis are shown as three axes perpendicular to one another.

The planar shape of the reflecting section 42 is, for example, a rectangle. In the example shown in the drawings, the reflecting section 42 has a rectangular shape having long sides along the X axis and short sides along the Y axis. The reflecting section 42 is composed of the micromirrors 44 arranged in a two-dimensional array. For example, the reflecting section 42 is composed of the micromirrors 44 arranged in a 1024×768 matrix. The illumination light beam is input from a direction oblique to the normal line of the plane in which the micromirrors 44 are arranged in the two-dimensional array. In other words, the illumination light beam is input from a direction nonparallel to a perpendicular (the normal line) of the plane. For example, the illumination light beam enters the micromirror 44 from the direction (from top right in FIG. 3A) at 45° with respect to the long side of the reflecting section 42 in the plan view of the reflecting section at an incident angle of 20° with respect to the normal line of the plane in which the micromirrors 44 are arranged.

The micromirrors 44 are each supported by, for example, a MOS transistor (not shown), and each swing in a predetermined angular range (e.g., in a range of +10° through −10°) in accordance with ON/OFF of the MOS transistor. In the example shown in the drawing, the micromirrors 44 each have a square shape, and each swing taking a diagonal axis A of the square as a rotational axis (a pivot axis) so that the upper right end and the lower left end move up and down in the Z-axis direction. In the reflecting section 42, when the illumination light beam L enters the reflecting section 42 from an oblique direction, light reflected by the micromirror 44 with the MOS transistor set in the ON state enters the projection lens 50. In contrast, the light reflected by the micromirror 44 with the MOS transistor set in the OFF state fails to enter the projection lens 50 since the tilt direction of the micromirror 44 is different from the case with the MOS transistor set in the ON state. Therefore, the image can be reproduced by the combination of the micromirrors 44 (bright pixels) with the MOS transistor set in the ON state to reflect the light toward the projection lens 50 and the micromirrors 44 (dark pixels) with the MOS transistor set in the OFF state not to reflect the light toward the projection lens 50.

In the example shown in the drawing, the incident direction of the illumination light beam L is a direction perpendicular to the axis A in the X-Y plane, and the incident angle of the illumination light beam L is 20° with respect to the Z axis. The light reflected by the micromirror 44 with the MOS transistor set in the ON state proceeds in, for example, the +Z direction (the perpendicular direction of the reflecting section 42), and then enters the projection lens 50. The light reflected by the micromirror 44 with the MOS transistor set in the OFF state is reflected at a reflection angle of, for example, 40° (40° with respect to the +Z axis), and fails to enter the projection lens 50.

Although not shown in the drawings, an optical system for collecting the illumination light beam and guiding it to the reflecting section 42 of the light modulation device 40 can also be disposed between the color wheel 30 and the light modulation device 40. For example, a relay lens system can be disposed as the optical system. In such a case, by setting the exit end surface 24 of the rod lens 20 and the reflecting section 42 of the light modulation device 40 to have an optically conjugate relation, the illumination light beam emitted from the exit end surface 24 of the rod lens 20 can efficiently be guided to the reflecting section 42 of the light modulation device 40. It should be noted that in a case of disposing some optical system in order to guide the illumination light beam from the exit end surface 24 of the rod lens 20 to the reflecting section 42 of the light modulation device 40, there is often the case that an optical aberration (e.g., a chromatic aberration of magnification) is caused by the optical system thus disposed. Therefore, it is preferable to set the way of arranging the light emitting sections 12 in the light source 10, the light emission intensity of the light emitting sections 12 described later, and the diffusion characteristic of an anisotropic diffusion element 310 (FIG. 5) taking also the influence of the optical aberration caused by the optical system thus disposed into consideration.

The projection lens 50 is disposed between the light modulation device 40 and a screen 60. The projection lens 50 enlarges an image formed by the light modulation device 40, and then projects the image to the screen (a display surface) 60.

The projector 100 according to the present embodiment has, for example the features described below.

In the projector 100, the distance between the first region 10a of the light emitting region 14 and the reflecting section 42 is shorter than the distance between the second region 10b of the light emitting region 14 and the reflecting section 42, and the arrangement density of the light emitting sections 12 in the first region 10a is lower than the arrangement density of the light emitting sections 12 in the second region 10b. Thus, even in the case of irradiating the reflecting section 42 from the oblique direction, the light intensity distribution (the illuminance distribution) in the reflecting section 42 can be equalized. Therefore, in the projector 100, an image with the brightness variation reduced can be obtained, and thus the image quality of the projection image can be improved.

In the projector 100, the light emitting region 14 has the shape obtained by distorting the shape similar to the reflecting section 42 so that the shorter the distance between a portion of the light emitting region 14 and the reflecting section 42 is, the more greatly the shape corresponding to the portion is shrunk. Thus, the distortion of the cross-sectional shape of the illumination light beam caused by the illumination light beam being emitted from a direction oblique to the normal line of the reflecting section 42 can be corrected. Therefore, it is possible to approximate, for example, the shape of the illumination light beam in the reflecting section 42 to the shape of the reflecting section 42. Therefore, it is possible to efficiently irradiate the reflecting section 42 with the illumination light beam, and thus the light efficiency can be improved.

In the projector 100, the entrance end surface 22 and the exit end surface 24 of the rod lens 20 have the same shape as the light emitting region 14. Thus, it is possible to efficiently guide the illumination light beam to the reflecting section 42 while keeping the light intensity distribution and the angle distribution of the illumination light beam having entered the rod lens 20.

2. Second Embodiment

Figure 4:
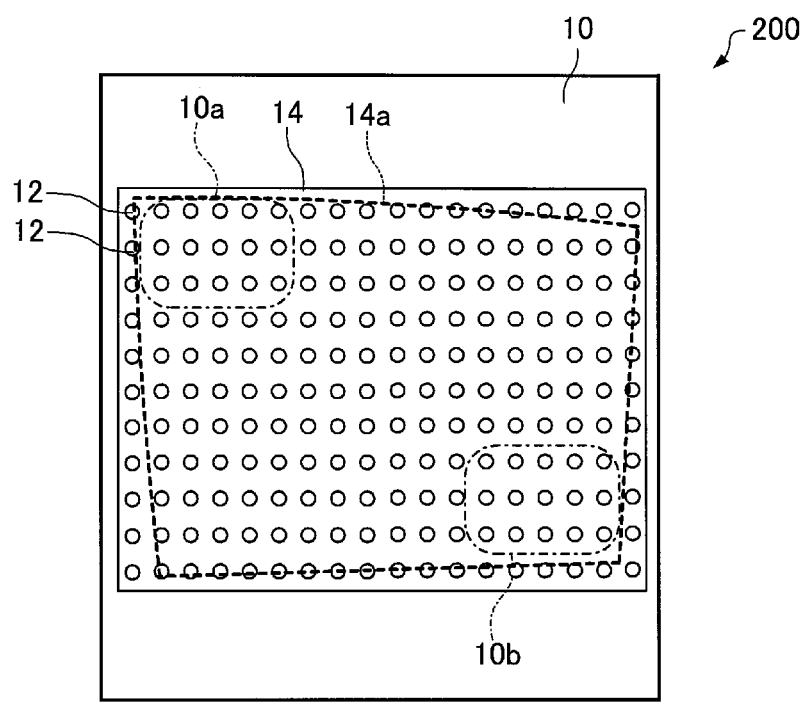
FIG. 4 is a plan view schematically showing a light source of a projector according to a second embodiment of the invention.

Then, a projector according to a second embodiment will be explained with reference to the accompanying drawings. FIG. 4 is a plan view schematically showing the light source 10 of a projector 200 according to the second embodiment. Hereinafter, points in which the projector 200 is different from the projector 100 described above will be explained, and the explanation of points in which the projector 200 is the same as the projector 100 will be omitted.

In the example of the projector 100 described above, the light intensity distribution (the illuminance distribution) in the reflecting section 42 is equalized by varying the arrangement density of the light emitting sections 12 of the light source 10 in accordance with the position of the light emitting sections 12.

In contrast, in the projector 200, the light intensity distribution (the illuminance distribution) in the reflecting section 42 is equalized by varying the light emission intensity of the light emitting sections 12 of the light source 10 in accordance with the position of the light emitting sections 12.

In the light source 10 of the projector 200, the light emission intensity during the image projection of the light emitting sections 12 located in the first region 10a is lower than the light emission intensity during the image projection of the light emitting sections 12 located in the second region 10b. Thus, it is possible to equalize the light intensity distribution (illuminance distribution) in the reflecting section 42. Further, inside the light emitting region 14, it is possible that the shorter the distance from the reflecting section 42 is, the lower the emission intensity during the image projection of the light emitting sections 12 is. In other words, it is possible that the emission intensity during the image projection is different from one another among the light emitting sections 12 disposed in the light emitting region 14, and the shorter the distance from the reflecting section 42 is, the lower the emission intensity during the image projection is. Thus, it is possible to similarly equalize the light intensity distribution (illuminance distribution) in the reflecting section 42.

In the regions except the first region 10a and the second region 10b, the emission intensity of the light emitting sections 12 is set in accordance with the distance between each of the regions and the reflecting section 42. For example, in the region sandwiched between the first region 10a and the second region 10b, the distance between the region and the reflecting section 42 is longer than the distance between the first region 10a and the reflecting section 42, and shorter than the distance between the second region 10b and the reflecting section 42. Therefore, the emission intensity of the light emitting sections 12 in the region sandwiched between the first region 10a and the second region 10b is higher than the emission intensity of the light emitting sections 12 in the first region 10a and lower than the emission intensity of the light emitting sections 12 in the second region 10b.

By setting the emission intensity of the light emitting sections 12 in each of the regions as described above, it is arranged that the emission intensity of the light emitting sections 12 varies in a substantially continuous manner in accordance with the distance of the light emitting sections 12 between the light emitting region 14 and the reflecting section 42 of the light modulation device 40.

In the example shown in the drawing, in the light source 10, the arrangement density (the number of light emitting sections per unit area) of the light emitting sections 12 located in the first region 10a is the same as the arrangement density of the light emitting sections 12 located in the second region 10b. The arrangement density of the light emitting sections 12 in the light emitting region 14 is uniform without variation. The light emitting sections 12 are arranged, for example, at regular intervals. Further, the light emitting sections 12 located in a region (the region outside the region 14), the emission light beam from which fails to reach the reflecting section 42, are not required to emit light.

According to the projector 200, since the emission intensity during the image projection of the light emitting sections 12 located in the first region 10a is lower than the emission intensity during the image projection of the light emitting sections 12 located in the second region 10b, it is possible to equalize the light intensity distribution (the illuminance distribution) in the reflecting section 42 even in the case in which the reflecting section 42 is irradiated from a direction oblique to the normal line thereof. Therefore, in the projector 200, an image with the brightness variation reduced can be obtained, and thus the image quality of the projection image can be improved.

3. Third Embodiment

Figure 5:
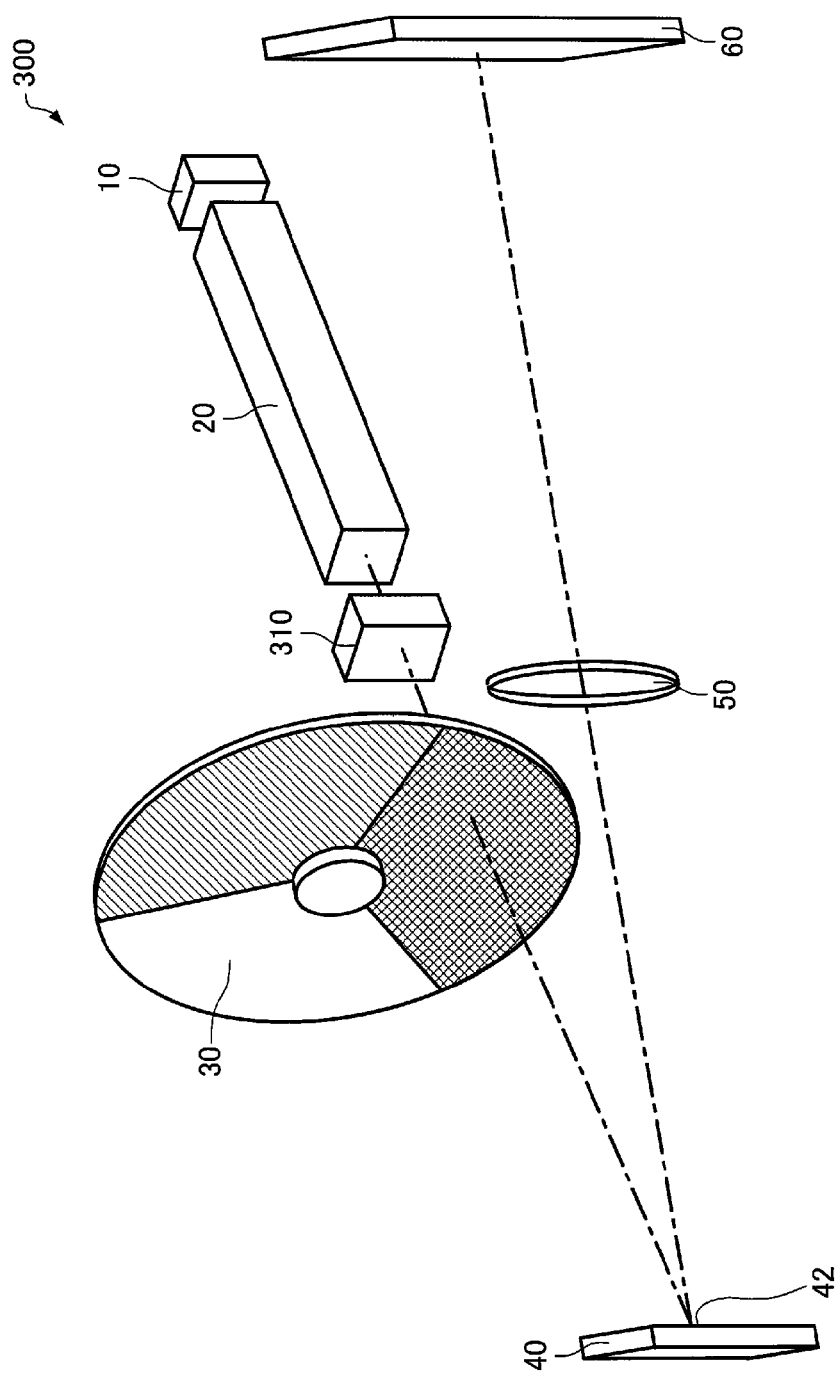
FIG. 5 is a perspective view schematically showing a projector according to a third embodiment of the invention.

Then, a projector according to a third embodiment will be explained with reference to the accompanying drawings. FIG. 5 is a perspective view schematically showing a projector 300 according to the third embodiment. Hereinafter, in the projector 300, members having the same functions as those of the constituents of the projectors 100, 200 will be denoted with the same reference symbols, and detailed explanation thereof will be omitted.

In the example of the projector 100 described above, the light intensity distribution (the illuminance distribution) in the reflecting section 42 is equalized by making the arrangement density of the light emitting sections 12 different between the regions 10a, 10b.

In contrast, in the projector 300, the light intensity distribution (the illuminance distribution) in the reflecting section 42 is equalized using an anisotropic diffusion element 310.

The anisotropic diffusion element 310 is located between the light source 10 and the light modulation device 40. In the example shown in the drawing, the anisotropic diffusion element 310 is located between the rod lens 20 and the color wheel 30. It should be noted that the anisotropic diffusion element 310 can be located between the light source 10 and the rod lens 20. The anisotropic diffusion element 310 is capable of varying at least one of the diffusion direction and the diffusion intensity distribution of the emission light beam from the light source 10 to thereby emit the light having the light intensity distribution (the illuminance distribution) to be equalized in the reflecting section 42. As the anisotropic diffusion element 310, there can be used an element obtained by forming a micro structure for diffusing light to have an optically asymmetrical shape, an element obtained by locally varying the arrangement state (e.g., the arrangement density) of the micro structures, and so on. Further, the anisotropic diffusion element 310 can be a hologram element.

In the projector 300, the anisotropic diffusion element 310 is an element for varying at least one of the diffusion direction and the diffusion intensity distribution of the emission light beam from the light source 10, and has a property (diffusion anisotropy) that the diffusion characteristic varies in accordance with the position of incidence of light to the element. Due to the property, it is possible to greatly diffuse the light beam having a short light path length from the light emitting section 12 to the reflecting section 42, while slightly diffusing the light beam with a long light path length from the light emitting element 12 to the reflecting section 42. Therefore, it is possible to generate the illumination light beam having the light intensity distribution (illuminance distribution) to be equalized in the reflecting section 42. Therefore, even in the case of irradiating the reflecting section 42 from the oblique direction, the light intensity distribution (the illuminance distribution) in the reflecting section 42 can be equalized. Therefore, in the projector 300, an image with the brightness variation reduced can be obtained, and thus the image quality of the projection image can be improved.

4. Fourth Embodiment

Figure 6:
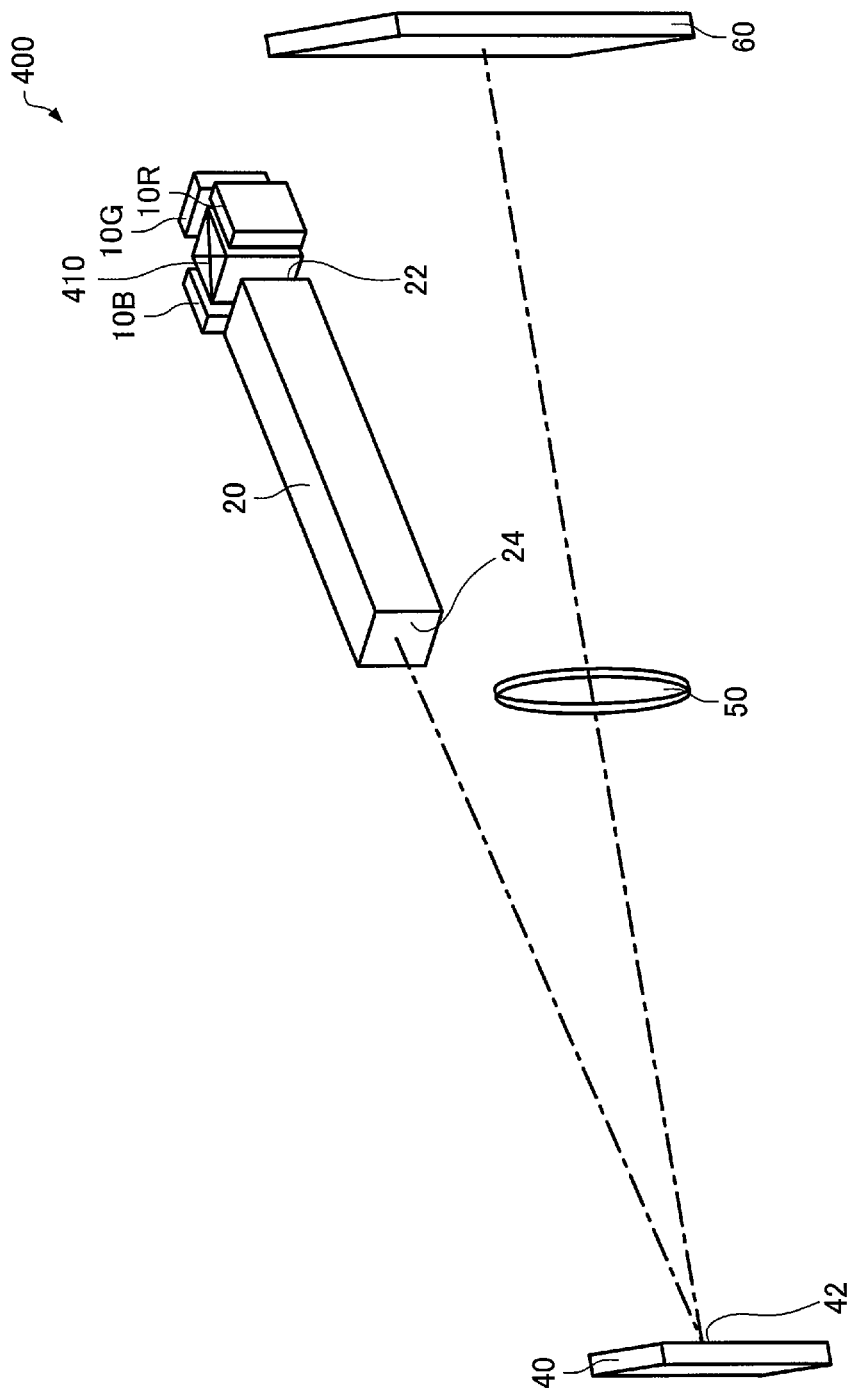
FIG. 6 is a perspective view schematically showing a projector according to a fourth embodiment of the invention.

Then, a projector according to a fourth embodiment will be explained with reference to the accompanying drawings. FIG. 6 is a perspective view schematically showing a projector 400 according to the fourth embodiment. Hereinafter, in the projector 400, members having the same functions as those of the constituents of the projectors 100, 200, and 300 will be denoted with the same reference symbols, and detailed explanation thereof will be omitted.

As shown in FIG. 1, in the example of the projector 100 described above, the light beams with the three primary colors are sequentially generated from the white light from the light source 10 using the color wheel 30.

In contrast, the projector 400 is configured including a light source 10R for emitting red light, a light source 10G for emitting green light, a light source 10B for emitting blue light, and a dichroic prism 410 without using the color wheel 30.

Figure 7C:
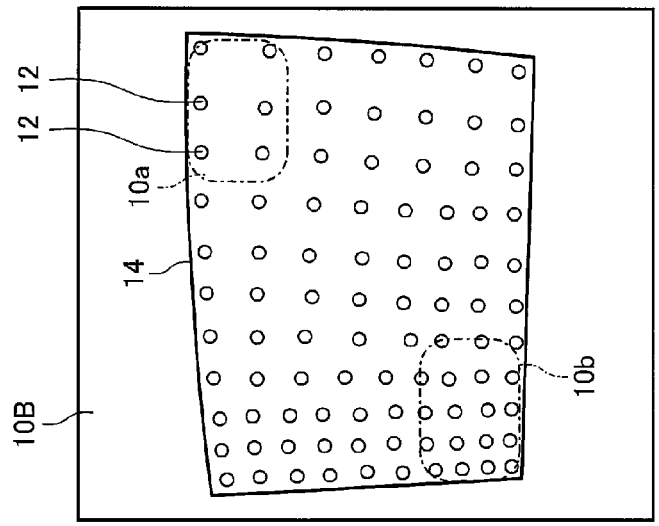
FIGS. 7A through 7C are plan views schematically showing light sources of the projector according to the fourth embodiment.
Figure 7B:
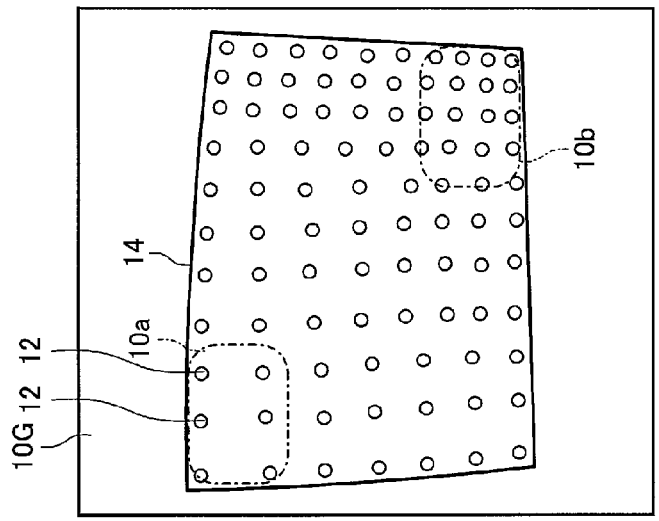
Figure 7A:
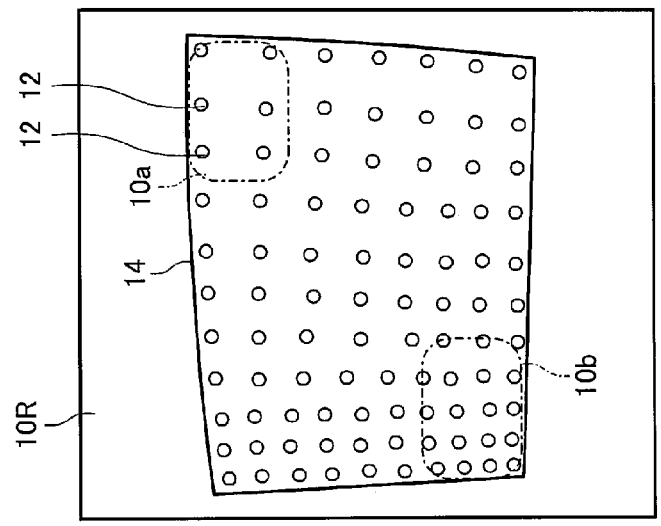

FIG. 7A is a plan view schematically showing the light source 10R viewed from a side from which the light is emitted, FIG. 7B is a plan view schematically showing the light source 10G viewed from the side from which the light is emitted, and FIG. 7C is a plan view schematically showing the light source 10B viewed from the side from which the light is emitted. The light source 10R is configured including a plurality of light emitting elements for emitting the red light. The light source 10G is configured including a plurality of light emitting elements for emitting the green light. The light source 10B is configured including a plurality of light emitting elements for emitting the blue light. The red light emitted from the light source 10R and the blue light emitted from the light source 10B are reflected by the dichroic prism 410, and the reflecting section 42 of the light modulation device 40 is irradiated with the red light and the blue light thus reflected. The green light emitted from the light source 10G is transmitted through the dichroic prism 410, and the reflecting section 42 is irradiated with the green light thus transmitted.

The shape of the light emitting region 14 of the light source 10G is the same as the shape of the light emitting region 14 of the light source 10 (see FIG. 2) of the projector 100 described above. Further, the shape of the light emitting region 14 of the light source 10R and the shape of the light emitting region 14 of the light source 10B are the shape obtained by horizontally flipping the shape of the light emitting region 14 of the light source 10G. Therefore, the red light emitted from the light source 10R and the blue light emitted from the light source 10B are reflected by the dichroic prism 410, and can thus have the same cross-sectional shape as that of the green light emitted from the light source 10G. Thus, the distortion of the cross-sectional shape of the illumination light beam caused by the reflecting section 42 being irradiated with the colored light emitted from each of the light sources 10R, 10G, and 10B from the oblique direction can be corrected. Therefore, for example, the shape of each colored light in the reflecting section 42 can be made to approximate the shape (rectangle) of the reflecting section 42 of the light modulation device 40.

Further, the arrangement of the light emitting sections 12 in the light emitting region 14 of the light source 10G is the same as the arrangement of the light emitting sections 12 in the light emitting region 14 of the light source of the projector 100 described above. Further, the arrangement of the light emitting sections 12 in the light emitting region 14 of the light source 10R and the arrangement of the light emitting sections 12 in the light emitting region 14 of the light source 10B are what is obtained by horizontally flipping the arrangement of light emitting sections 12 of the light source 10G. Therefore, the light sources 10R, 10G, and 10B can emit the light having the light intensity to be equalized in the reflecting section 42 of the light modulation device 40.

The dichroic prism 410 can guide the light from the light sources 10R, 10G, and 10B to the reflecting section 42 of the light modulation device 40 via the rod lens 20. The dichroic prism 410 is formed by bonding two right angle prisms to each other, and has a dielectric multilayer film for reflecting the red light and a dielectric multilayer film for reflecting the blue light disposed on the inside surfaces thereof. The red light emitted from the light source 10R is reflected by the dielectric multilayer film, and then enters the rod lens 20, and thus the reflecting section 42 of the light modulation device 40 is irradiated with the red light. Further, the blue light emitted from the light source 10B is reflected by the dielectric multilayer film, and then enters the rod lens 20, and thus the reflecting section 42 of the light modulation device 40 is irradiated with the blue light. Further, the green light emitted from the light source 10G is transmitted through these dielectric multilayer films, and then enters the rod lens 20, and thus the reflecting section 42 of the light modulation device 40 is irradiated with the green light.

According to the projector 400, the color image can be projected without using the color wheel 30.

Similarly to the projector 100, in the projector 400, an image with the brightness variation reduced can be obtained, and thus the image quality of the projection image can be improved.

The embodiments described above are each nothing more than an example, and the invention is not limited thereto. For example, it is also possible to arbitrarily combine the embodiments described above.

The invention includes configurations (e.g., configurations having the same function, the same way, and the same result, or configurations having the same object and the same advantages) substantially the same as those described as the embodiments of the invention. Further, the invention includes configurations obtained by replacing a non-essential part of the configuration described as the embodiments of the invention. Further, the invention includes configurations exerting the same functional effects and configurations capable of achieving the same object as the configuration described as the embodiments of the invention. Further, the invention includes configurations obtained by adding technologies known to the public to the configurations described as the embodiments of the invention.

The entire disclosure of Japanese Patent Application No. 2012-105676, filed May 7, 2012 is expressly incorporated by reference herein.

What is claimed is:

1. A projector comprising:
a light source having a plurality of light emitting sections;
a light modulation device including a reflecting section adapted to reflect the light from the light source in accordance with image information; and
a projection lens adapted to project an image formed by the light modulation device,
wherein the light from the light source obliquely enters the reflecting section,
the light source includes a first region where the light emitting sections are disposed at a first density, a second region where the light emitting sections are disposed at a second density higher than the first density, and the first region and the second region are located at a circumference of the light source,
the light source includes a third region between the first region and the second region, the light emitting sections are disposed at a third density in the third region, and the third density gradually increases from the first region toward the second region, and
a distance between the first region and the reflecting section is shorter than a distance between the second region and the reflecting section.

2. A projector comprising:
a light source having a plurality of light emitting sections;
a light modulation device including a reflecting section adapted to reflect the light from the light source in accordance with image information; and
a projection lens adapted to project an image formed by the light modulation device,
wherein the light from the light source obliquely enters the reflecting section,
the light source includes a first region where the light emitting sections emit light at a first emission intensity when projecting the image, a second region where the light emitting sections emit light at a second emission intensity higher than the first emission intensity when projecting the image, and the first region and the second region are located at a circumference of the light source,
the light source includes a third region between the first region and the second region, the light emitting sections emit light at a third emission intensity in the third region when projecting the image, and the third emission intensity gradually increases from the first region toward the second region, and
a distance between the first region and the reflecting section is shorter than a distance between the second region and the reflecting section.

3. The projector according to claim 1, wherein
the light source includes an entire region where the light emitting sections are disposed, and the entire region includes the first through third regions, and a contour shape of the entire region has a shape obtained by distorting a shape similar to a planar shape of the reflecting section in such a manner that the shorter a distance between a portion of the entire region and the reflecting section is, the more greatly the shape corresponding to the portion is enlarged.

4. The projector according to claim 2, wherein the light source includes an entire region where the light emitting sections are disposed, and the entire region includes the first through third regions, and a contour shape of the entire region has a shape obtained by distorting a shape similar to a planar shape of the reflecting section in such a manner that the shorter a distance between a portion of the entire region and the reflecting section is, the more greatly the shape corresponding to the portion is enlarged.

5. The projector according to claim 1, further comprising:

a rod lens located between the light source and the light modulation device, wherein the rod lens has a first end surface to which the light from the light source is input, and a second end surface from which the light input from the first end surface is emitted, and the first end surface and the second end surface have the same shape as a contour shape of a region where the light emitting sections are disposed.

6. The projector according to claim 2, further comprising:

a rod lens located between the light source and the light modulation device, wherein the rod lens has a first end surface to which the light from the light source is input, and a second end surface from which the light input from the first end surface is emitted, and the first end surface and the second end surface have the same shape as a contour shape of a region where the light emitting sections are disposed.

7. The projector according to claim 2, wherein a density of the light emitting sections in the first region and a density of the light emitting sections in the second region are equal to each other.

* * * * *